(12) United States Patent
Domino et al.

(10) Patent No.: US 12,212,976 B2
(45) Date of Patent: Jan. 28, 2025

(54) ANTENNA ARRANGEMENT FOR DISTRIBUTING MILLIMETER WAVE CELLULAR SERVICE OVER A FACE OF A BUILDING

(71) Applicant: Skyworks Solutions, Inc., Irvine, CA (US)

(72) Inventors: William J. Domino, Yorba Linda, CA (US); David Scott Whitefield, Andover, MA (US)

(73) Assignee: Skyworks Solutions, Inc., Irvine, CA (US)

( * ) Notice: Subject to any disclaimer, the term of this patent is extended or adjusted under 35 U.S.C. 154(b) by 432 days.

(21) Appl. No.: 17/804,380

(22) Filed: May 27, 2022

(65) Prior Publication Data

US 2022/0394496 A1 Dec. 8, 2022

Related U.S. Application Data

(60) Provisional application No. 63/202,239, filed on Jun. 2, 2021.

(51) Int. Cl.
| | |
|---|---|
| *H04W 16/28* | (2009.01) |
| *H01Q 9/04* | (2006.01) |
| *H01Q 21/08* | (2006.01) |
| *H04W 16/26* | (2009.01) |

(52) U.S. Cl.
CPC .......... *H04W 16/26* (2013.01); *H01Q 9/0407* (2013.01); *H01Q 21/08* (2013.01); *H04W 16/28* (2013.01)

(58) Field of Classification Search
CPC ..... H04W 16/26; H04W 16/28; H04W 16/30; H01Q 9/0407; H01Q 21/08; H04B 7/0617
See application file for complete search history.

(56) References Cited

U.S. PATENT DOCUMENTS

| | | | |
|---|---|---|---|
| 4,185,286 A * | 1/1980 | Drabowitch | H01Q 3/46 343/754 |
| 6,128,471 A | 10/2000 | Quelch et al. | |
| 6,556,174 B1 * | 4/2003 | Hamman | H01Q 19/10 343/912 |
| 10,326,199 B2 * | 6/2019 | Au | H01Q 1/38 |
| 10,670,644 B2 * | 6/2020 | Brunel | H04B 7/0404 |
| 11,088,755 B2 * | 8/2021 | Ashrafi | H04B 7/15507 |
| 11,271,625 B2 * | 3/2022 | Park | H04L 5/0051 |
| 11,706,735 B2 * | 7/2023 | Ku | H04B 7/0617 455/456.6 |
| 2016/0322713 A1* | 11/2016 | You | H01Q 21/24 |
| 2018/0324730 A1* | 11/2018 | Lee | H04J 11/0069 |
| 2019/0074854 A1* | 3/2019 | Raghavan | H04B 1/3838 |

(Continued)

*Primary Examiner* — Julio R Perez
(74) *Attorney, Agent, or Firm* — Knobbe, Martens, Olson & Bear, LLP

(57) ABSTRACT

Apparatus and methods for distributing millimeter wave cellular service over a face of a building are disclosed. In certain embodiments, an antenna assembly includes an antenna upper unit configured to extend from a top of a building, such as from a roof. The antenna upper unit includes a first linear antenna array that radiates a transmit beam having a disc-shaped pattern. The antenna assembly includes an antenna lower unit configured to extend from the building beneath the antenna upper unit. The antenna lower unit includes a second linear antenna array that receives the transmit beam.

20 Claims, 14 Drawing Sheets

SIDE VIEW

(56) References Cited

U.S. PATENT DOCUMENTS

| | | | |
|---|---|---|---|
| 2021/0136598 A1* | 5/2021 | Raghavan | H04B 7/0456 |
| 2021/0265741 A1* | 8/2021 | Kenington | H01Q 21/24 |
| 2021/0399777 A1* | 12/2021 | Ihalainen | H04B 7/0617 |
| 2022/0158702 A1* | 5/2022 | Nallampatti Ekambaram | H04B 7/086 |
| 2022/0394496 A1* | 12/2022 | Domino | H01Q 9/0407 |
| 2024/0322873 A1* | 9/2024 | Raghavan | H04L 5/0048 |

* cited by examiner

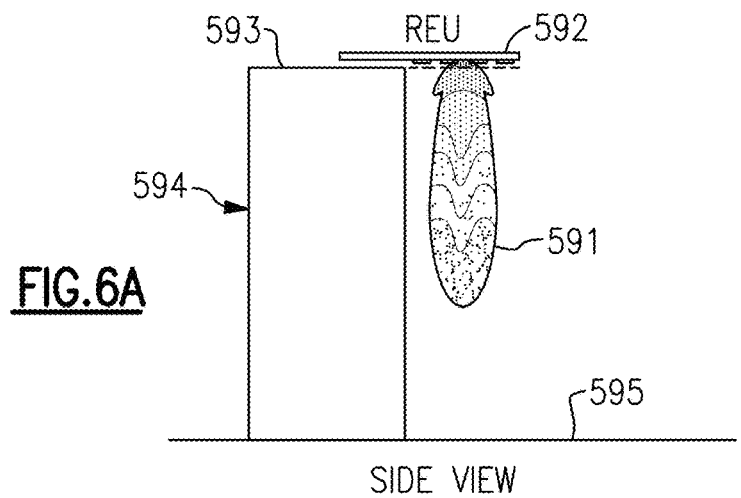
FIG.6A  SIDE VIEW
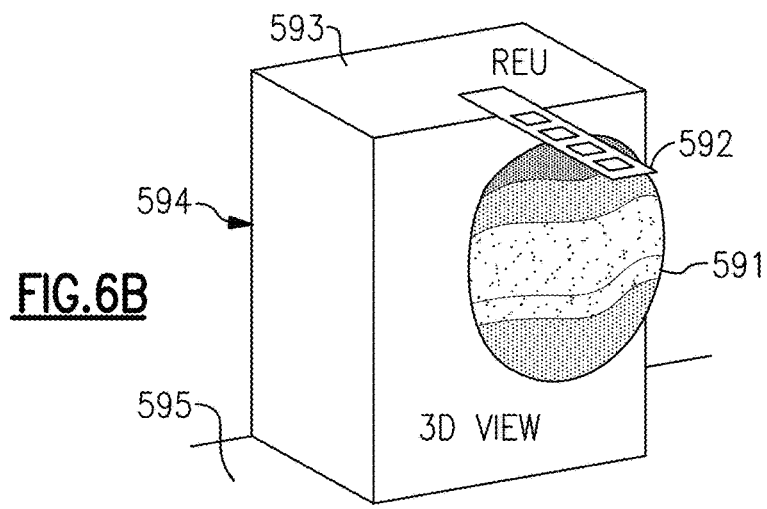
FIG.6B  3D VIEW
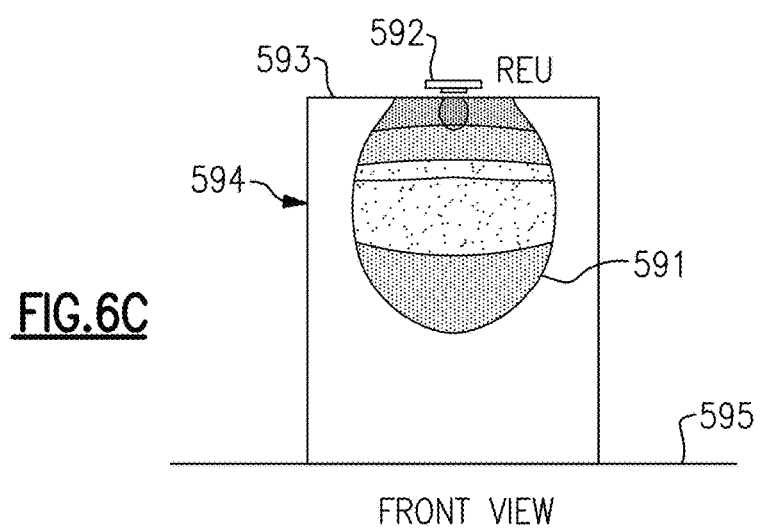
FIG.6C  FRONT VIEW

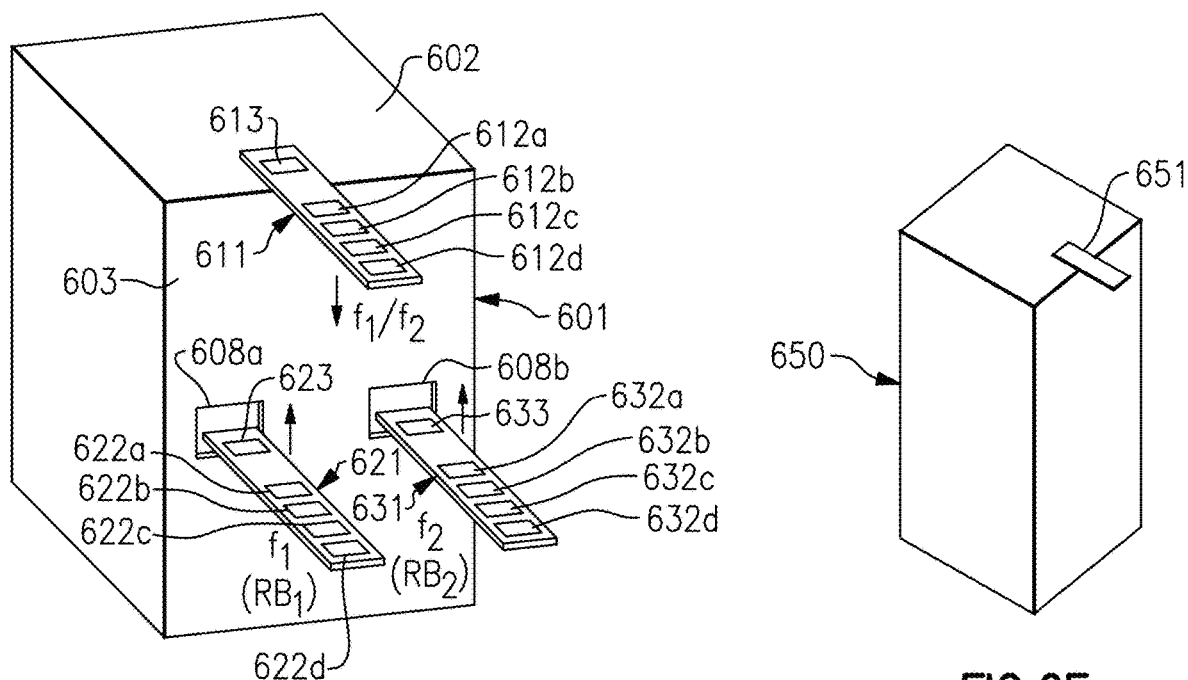
FIG.6D
FIG.6E
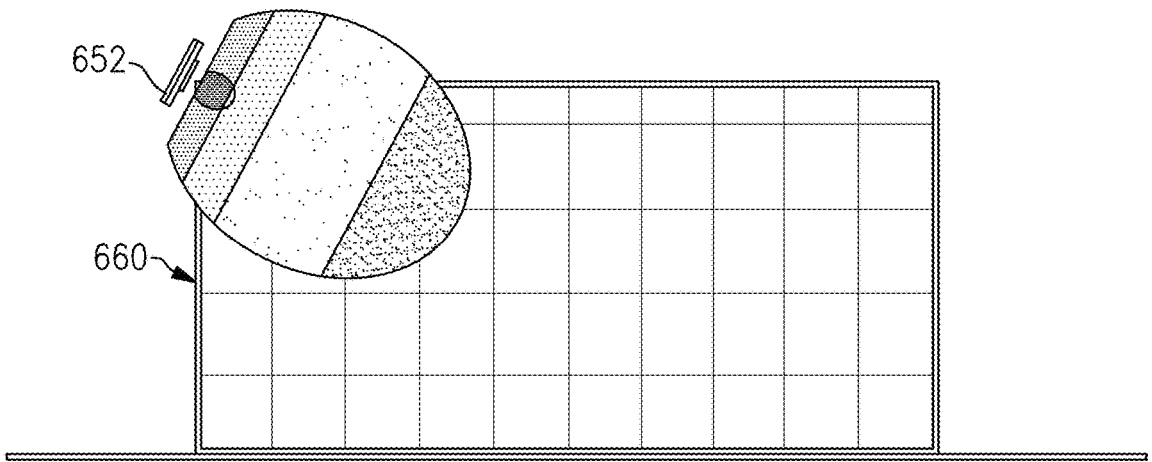
FIG.6F

SIDE VIEW

FRONT VIEW

ANTENNA ARRANGEMENT FOR DISTRIBUTING MILLIMETER WAVE CELLULAR SERVICE OVER A FACE OF A BUILDING

CROSS-REFERENCE TO RELATED APPLICATIONS

This application claims the benefit of priority under 35 U.S.C. § 119 of U.S. Provisional Patent Application No. 63/202,239, filed Jun. 2, 2021 and titled "ANTENNA ARRANGEMENT FOR DISTRIBUTING MILLIMETER WAVE CELLULAR SERVICE OVER A FACE OF A BUILDING," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, for instance, in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

Examples of RF communication systems include, but are not limited to, mobile phones, tablets, base stations, network access points, customer-premises equipment (CPE), laptops, and wearable electronics.

SUMMARY

In certain embodiments, the present disclosure relates to an antenna assembly for distributing millimeter wave cellular service. The antenna assembly includes an antenna upper unit configured to extend from a top of a building, the antenna upper unit including a first linear antenna array configured to radiate a transmit beam having a disc-shaped pattern. The antenna assembly further includes a first antenna lower unit configured to extend from the building beneath the antenna upper unit, the first antenna lower unit including a second linear antenna array configured to receive the transmit beam.

In various embodiments, the first linear antenna array is configured to extend cantilever from a roof of the building.

In several embodiments, the antenna upper unit further includes a plurality of power amplifiers configured to drive the first linear antenna array.

In some embodiments, the first linear antenna array includes a single row of patch antennas. According to a number of embodiments, each patch antenna in the single row of patch antennas receives a common radio frequency transmit signal of equal phase and amplitude. In accordance with several embodiments, a pitch of the single row of patch antennas is about equal to half a fundamental wavelength of the common radio frequency transmit signal. According to various embodiments, the common radio frequency transmit signal is a millimeter wave signal.

In several embodiments, the first linear antenna array and the second linear antenna array each include a single row of patch antennas.

In some embodiments, the antenna assembly further includes a second antenna lower unit, the first antenna lower unit and the second antenna lower unit configured to operate using different resource block allocations of the transmit beam.

In certain embodiments, the present disclosure relates to a building with extended cellular coverage. The building includes a roof, and an antenna upper unit extending from an edge of the roof. The antenna upper unit includes a first linear antenna array configured to radiate a transmit beam having a disc-shaped pattern. The building further includes a first window, and a first antenna lower unit extending from the first window. The first antenna lower unit includes a second linear antenna array configured to receive the transmit beam.

In several embodiments, the first linear antenna array extends cantilever from the roof.

In various embodiments, the antenna upper unit further includes a plurality of power amplifiers configured to drive the first linear antenna array.

In some embodiments, the antenna upper unit is mounted to a corner of the roof.

In several embodiments, the first linear antenna array includes a single row of patch antennas. According to a number of embodiments, each patch antenna in the single row of patch antennas receives a common radio frequency transmit signal of equal amplitude and phase.

In various embodiments, the first linear antenna array points downward and the second linear antenna array points upward.

In several embodiments, further includes a second window and a second antenna lower unit extending from the second window, the first antenna lower unit and the second antenna lower unit configured to operate using different resource block allocations of the transmit beam.

In certain embodiments, the present disclosure relates to a method for distributing millimeter wave cellular service. The method includes radiating a transmit beam having a disc-shaped pattern from a first linear antenna array of an antenna upper unit extending from a top of a building, and receiving the transmit beam at a second linear antenna array of a first antenna lower unit extending from a portion of the building beneath the top of the building.

In various embodiments, the method further includes driving the first linear antenna array with a plurality of power amplifiers each receiving an RF signal of equal amplitude and equal phase.

In several embodiments, the method further includes receiving the transmit beam at a third linear antenna array of a second antenna lower unit beneath the antenna upper unit.

BRIEF DESCRIPTION OF THE DRAWINGS

FIG. 6A is a side view of one example of an antenna radiation pattern for an antenna roof edge unit (RFE).

FIG. 6B is a perspective view of one example of an antenna radiation pattern for an antenna RFE.

FIG. 6C is a front view of one example of an antenna radiation pattern for an antenna RFE.

FIG. 6D is a schematic diagram of a building implemented with millimeter wave cellular service distributed in accordance with another embodiment.

FIG. 6E is a schematic diagram of positioning of an antenna RFE according to one embodiment.

FIG. 6F is a schematic diagram of positioning of an antenna RFE according to another embodiment.

DETAILED DESCRIPTION OF EMBODIMENTS

Figure 1:
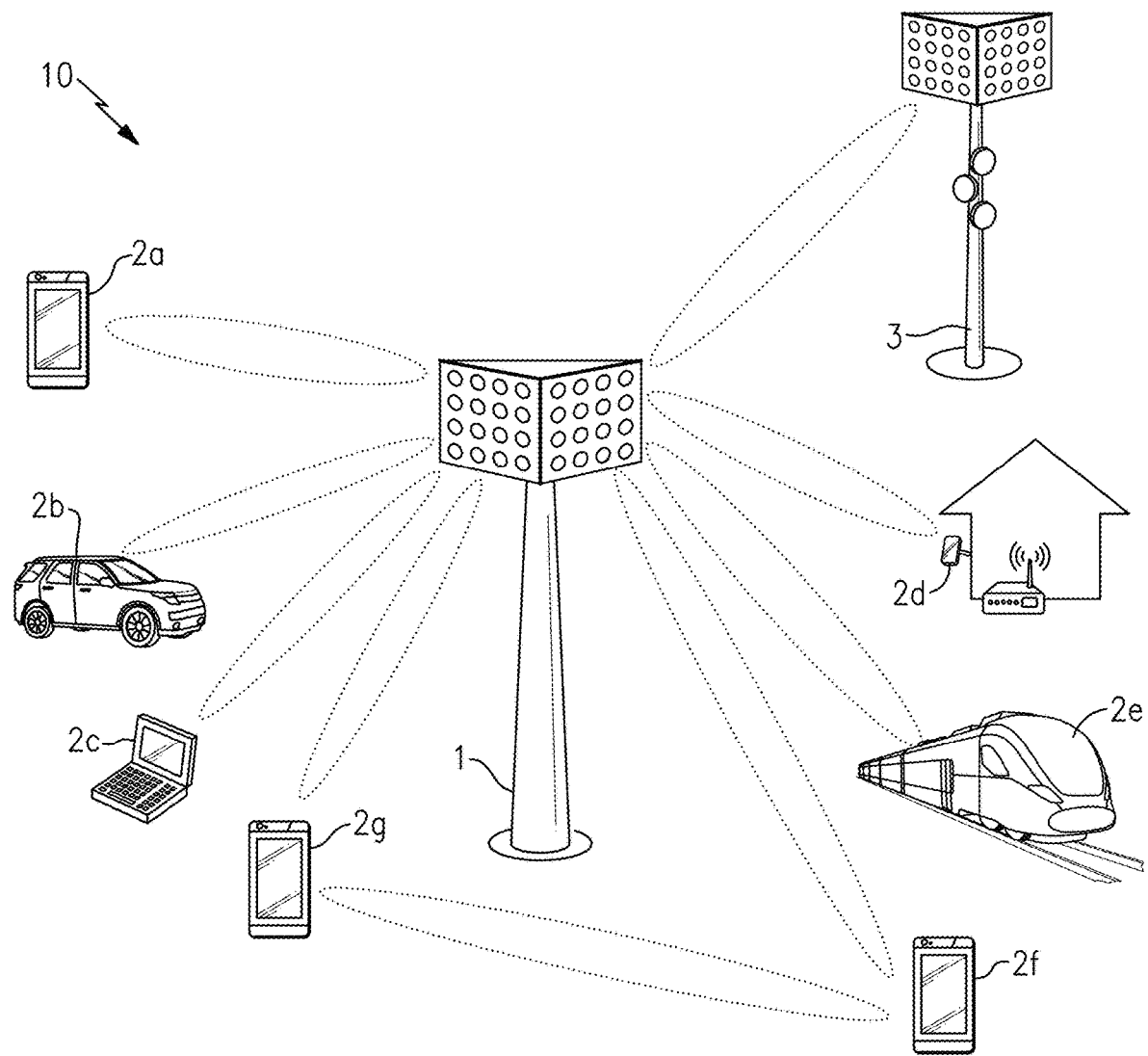
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 48 GHz to 300 GHz and/or upper centimeter wave frequencies in the range of 6 GHz to 48 GHz. With respect to FR2 of 5G, such beamforming can be performed over FR2-1 (24 GHz to 52 GHz) and/or FR2-2 (52 GHz to 71 GHz).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

In certain implementations, the communication network 10 supports supplementary uplink (SUL) and/or supplementary downlink (SDL). For example, when channel conditions are good, the communication network 10 can direct a particular UE to transmit using an original uplink frequency, while when channel condition is poor (for instance, below a certain criteria) the communication network 10 can direct the UE to transmit using a supplementary uplink frequency that is lower than the original uplink frequency. Since cell coverage increases with lower frequency, communication range and/or signal-to-noise ratio (SNR) can be increased using SUL. Likewise, SDL can be used to transmit using an original downlink frequency when channel conditions are good, and to transmit using a supplementary downlink frequency when channel conditions are poor.

Figure 2A:
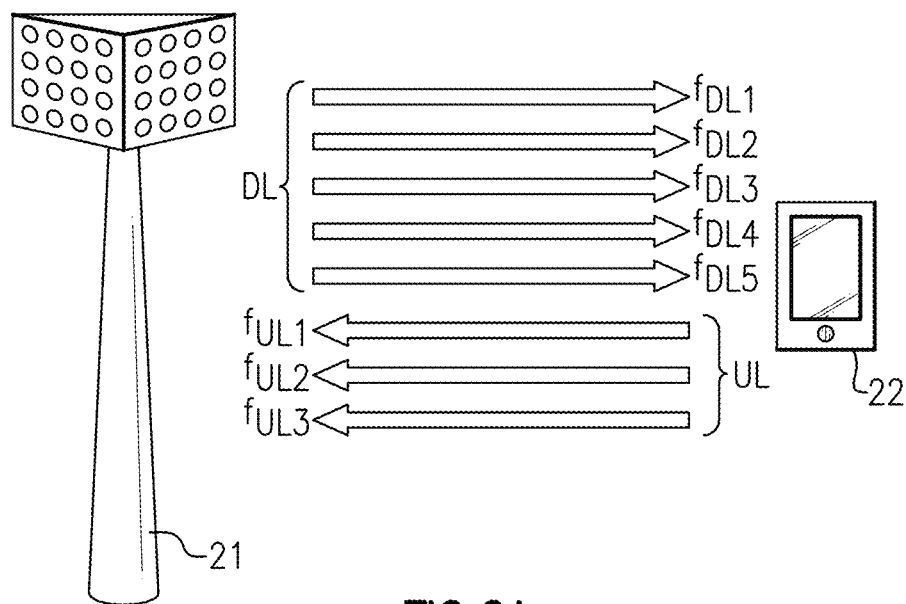
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
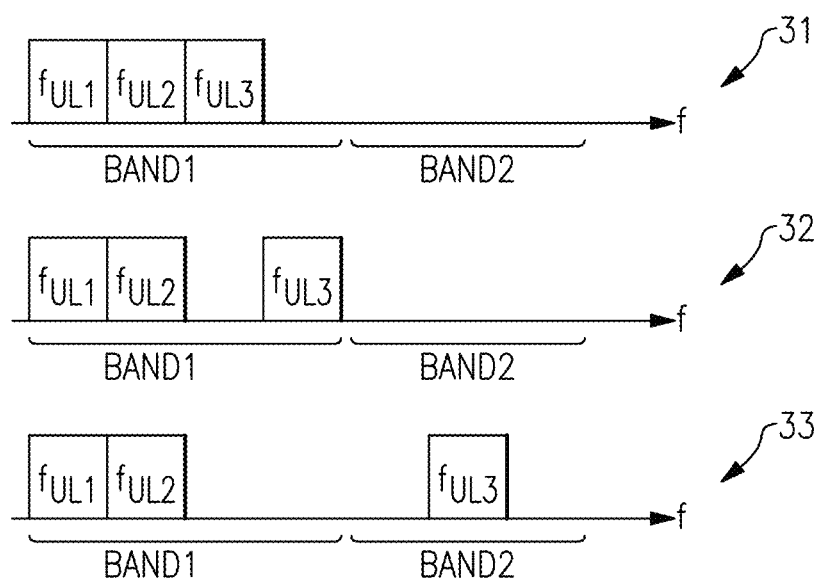
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier full, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
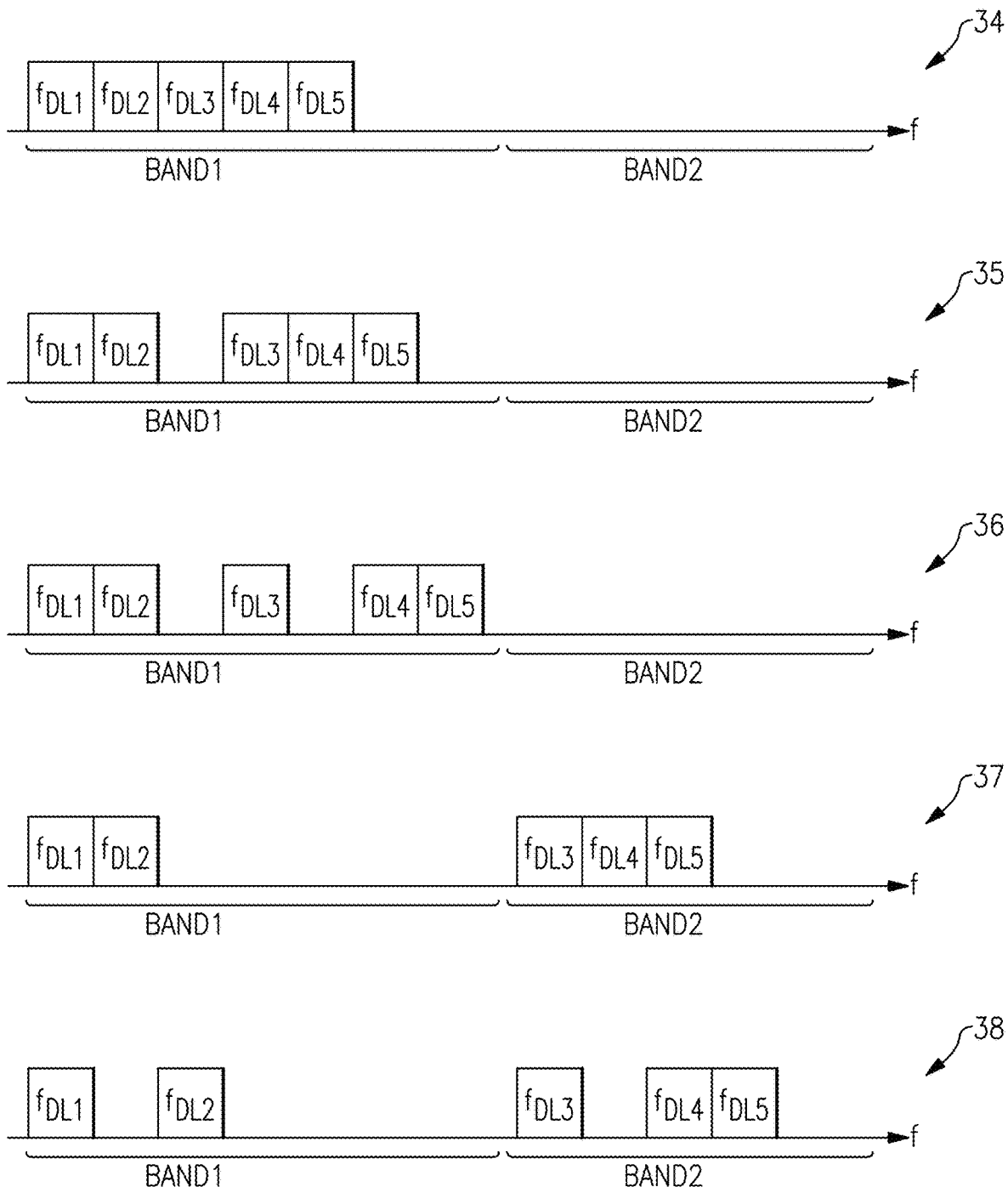
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHz) and/or a 6 GHz band (5925 MHz to 7125 MHz).

Figure 3A:
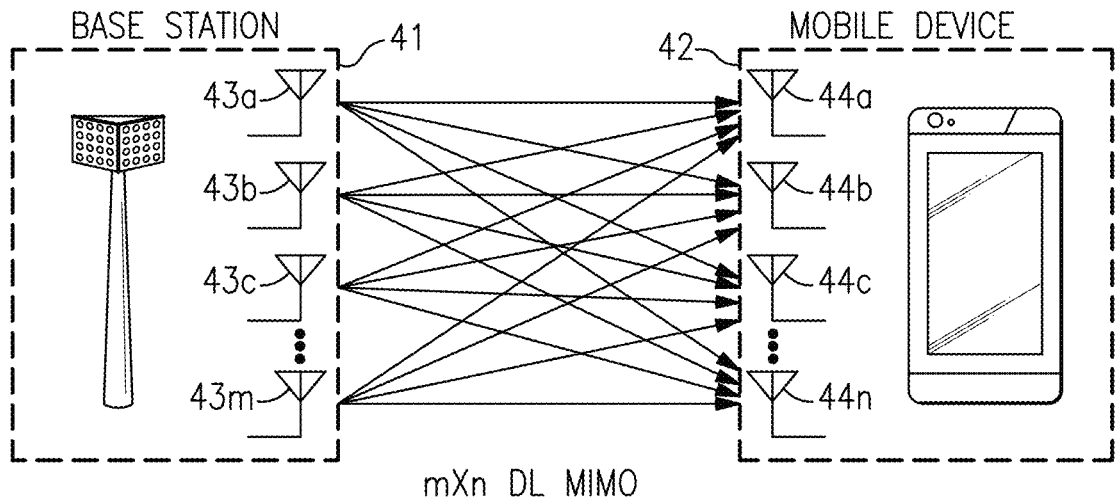
FIG. 3A is a schematic diagram of one example of a downlink channel using multi-input and multi-output (MIMO) communications.
Figure 3B:
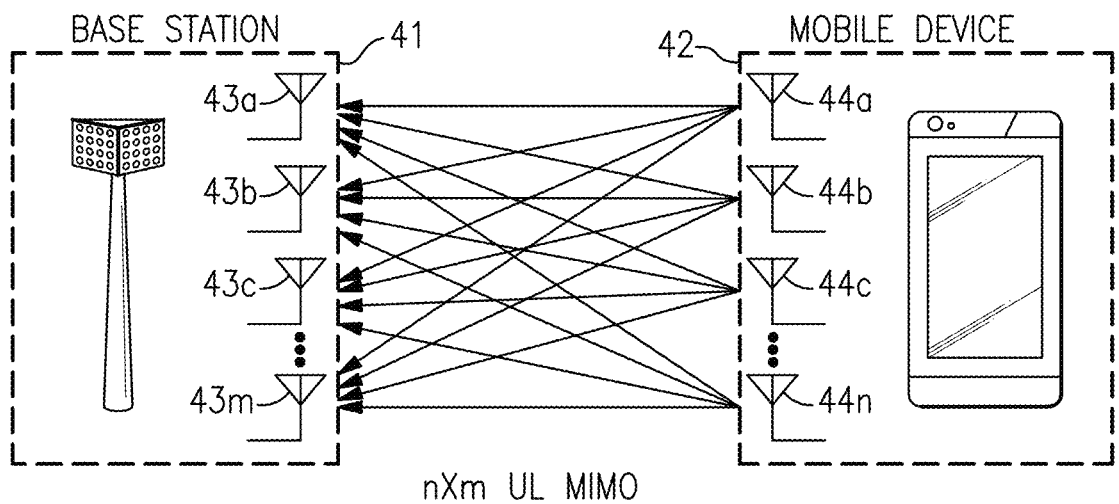
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas $43a$, $43b$, $43c$, ... $43m$ of the base station 41 and receiving using N antennas $44a$, $44b$, $44c$, ... $44n$ of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas $44a$, $44b$, $44c$, ... $44n$ of the mobile device 42 and receiving using M antennas $43a$, $43b$, $43c$, ... $43m$ of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
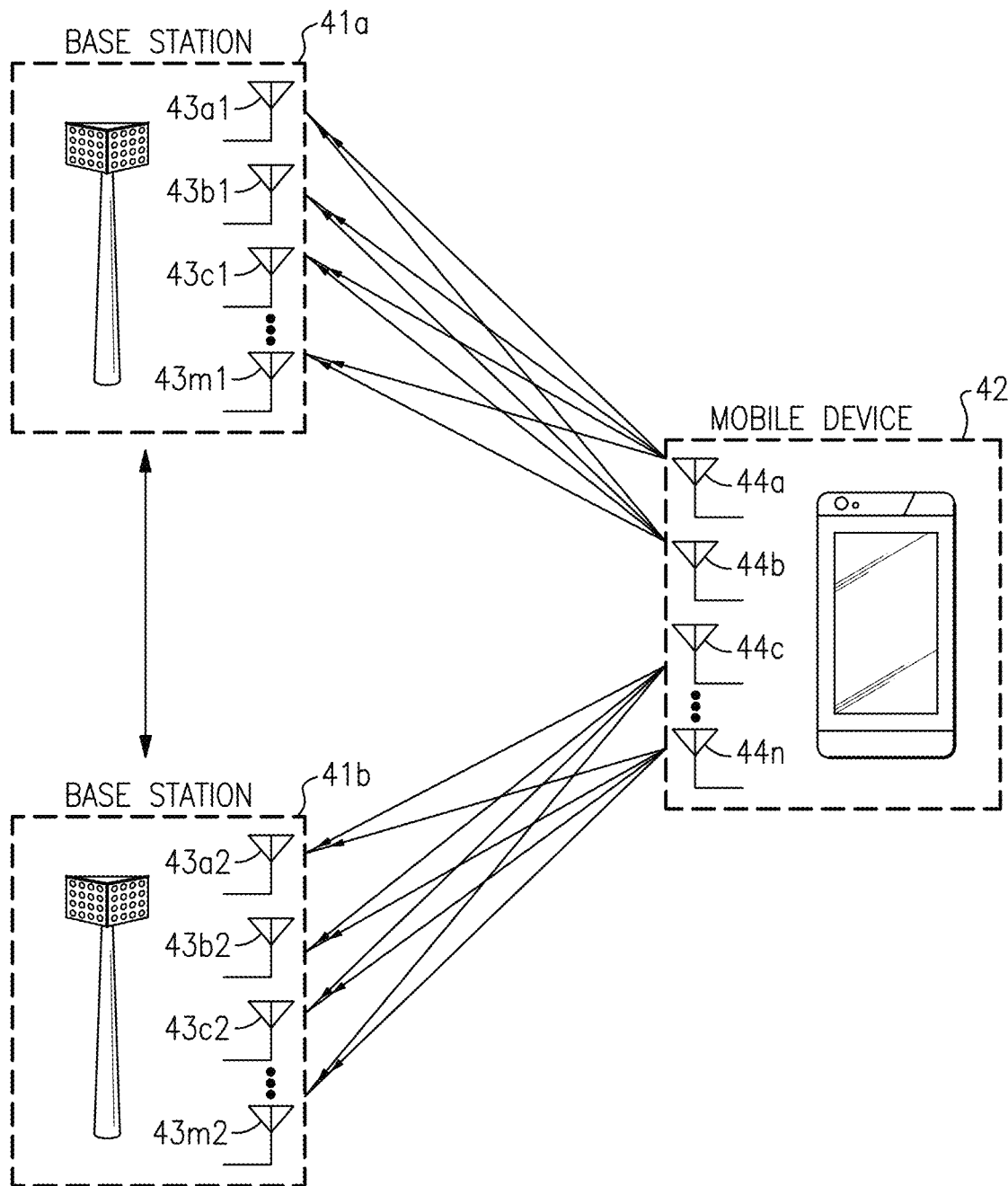
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas $44a$, $44b$, $44c$, ... $44n$ of the mobile device 42. Additional a first portion of the uplink transmissions are received using M antennas $43a1$, $43b1$, $43c1$, ... $43m1$ of a first base station $41a$, while a second portion of the uplink transmissions are received using M antennas $43a2$, $43b2$, $43c2$, ... $43m2$ of a second base station $41b$. Additionally, the first base station $41a$ and the second base station $41b$ communication with one another over wired, optical, and/or wireless links.

The MIMO scenario of FIG. 3C illustrates an example in which multiple base stations cooperate to facilitate MIMO communications.

With the introduction of the 5G NR air interface standards, 3GPP has allowed for the simultaneous operation of 5G and 4G standards in order to facilitate the transition. This mode can be referred to as Non-Stand-Alone (NSA) operation or E-UTRAN New Radio-Dual Connectivity (EN-DC) and involves both 4G and 5G carriers being simultaneously transmitted from a user equipment (UE).

In certain EN-DC applications, dual connectivity NSA involves overlaying 5G systems onto an existing 4G core network. For dual connectivity in such applications, the control and synchronization between the base station and the UE can be performed by the 4G network while the 5G network is a complementary radio access network tethered to the 4G anchor. The 4G anchor can connect to the existing 4G network with the overlay of 5G data/control.

Figure 4A:
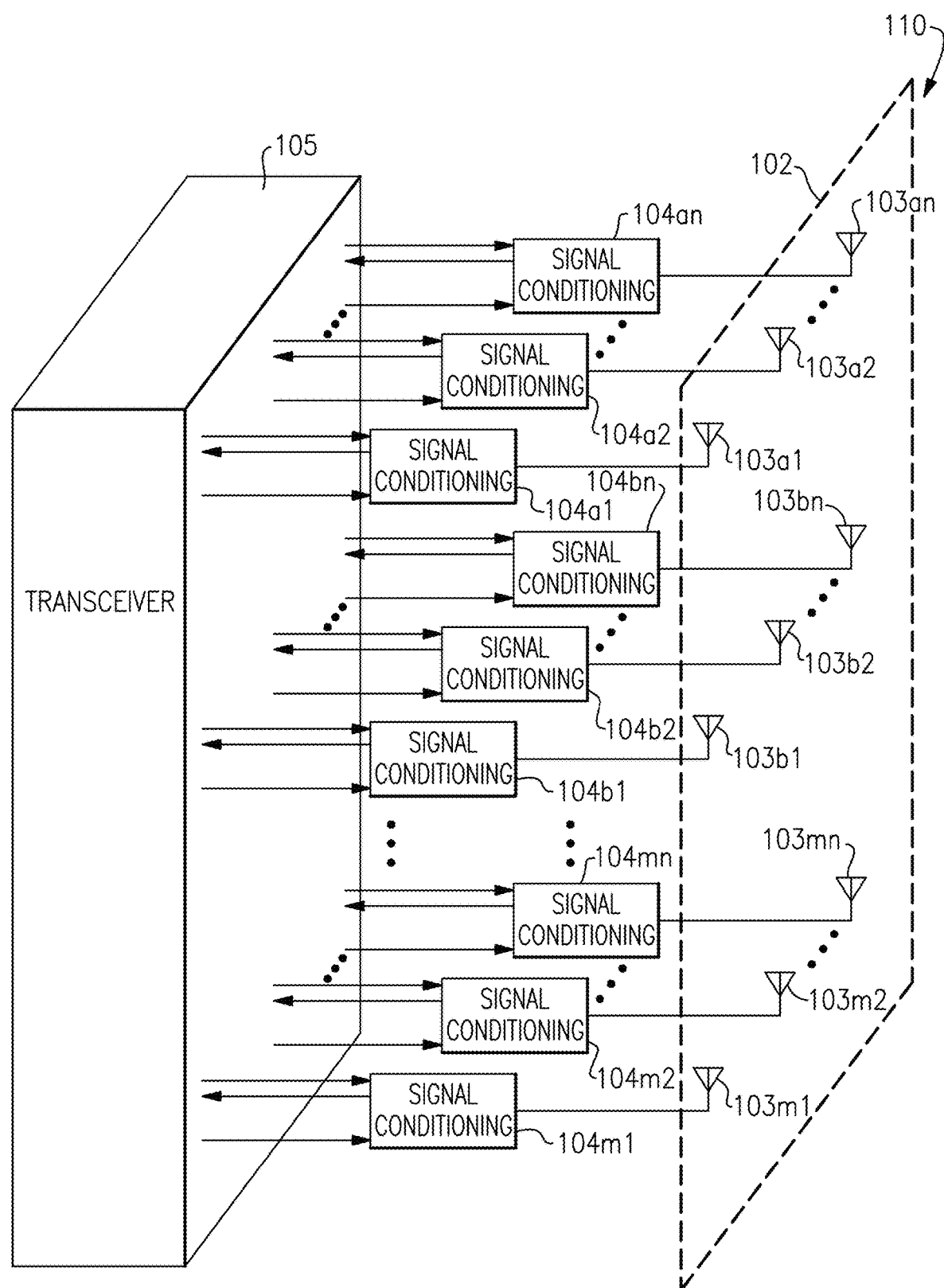
FIG. 4A is a schematic diagram of one example of a communication system that operates with beamforming.

FIG. 4A is a schematic diagram of one example of a communication system 110 that operates with beamforming. The communication system 110 includes a transceiver 105, signal conditioning circuits $104a1$, $104a2$ ... $104an$, $104b1$, $104b2$ ... $104bn$, $104m1$, $104m2$ ... $104mn$, and an antenna array 102 that includes antenna elements $103a1$, $103a2$ ... $103an$, $103b1$, $103b2$ ... $103bn$, $103m1$, $103m2$ ... $103mn$.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 4A, the transceiver 105 generates control signals for the signal conditioning circuits. The control signals can be used for a variety of functions, such as controlling the gain and phase of transmitted and/or received signals to control beamforming.

Figure 4B:
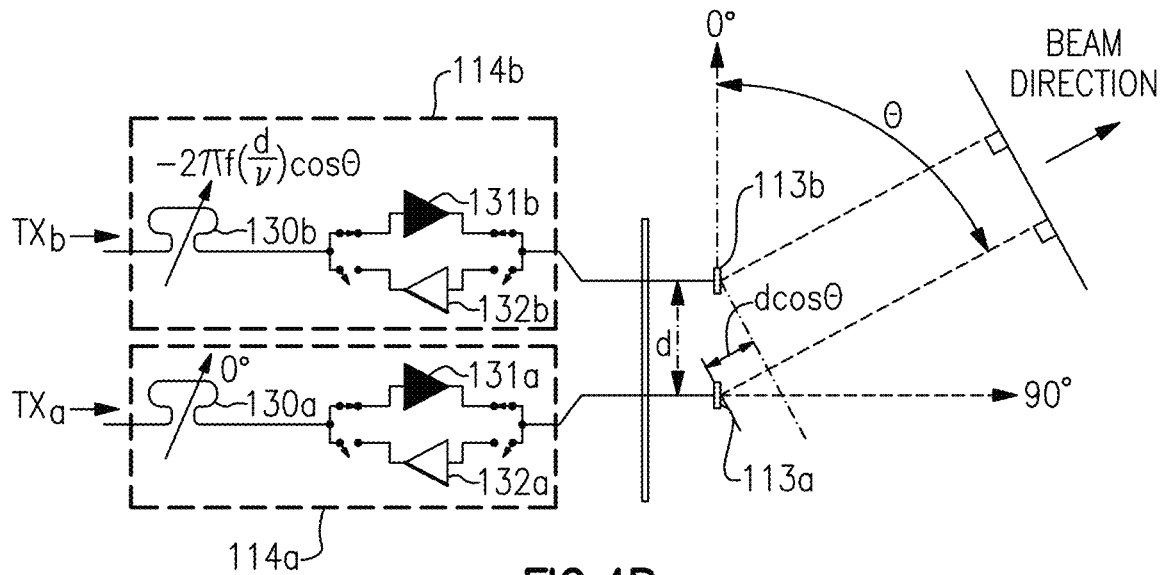
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 4B has been annotated with an angle θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle θ can be achieved. For example, when the first phase shifter 130a has a reference value of 0°, the second phase shifter 130b can be controlled to provide a phase shift of about $-2\pi f(d/v)\cos\theta$ radians, where f is the fundamental frequency of the transmit signal, d is the distance between the antenna elements, v is the velocity of the radiated wave, and π is the mathematic constant pi.

In certain implementations, the distance d is implemented to be about ½λ, where λ is the wavelength of the fundamental component of the transmit signal. In such implementations, the second phase shifter 130b can be controlled to provide a phase shift of about $-\pi\cos\theta$ radians to achieve a transmit beam angle θ.

Accordingly, the relative phase of the phase shifters 130a, 130b can be controlled to provide transmit beamforming. In certain implementations, a baseband processor and/or a transceiver (for example, the transceiver 105 of FIG. 4A) controls phase values of one or more phase shifters and gain values of one or more controllable amplifiers to control beamforming.

Figure 4C:
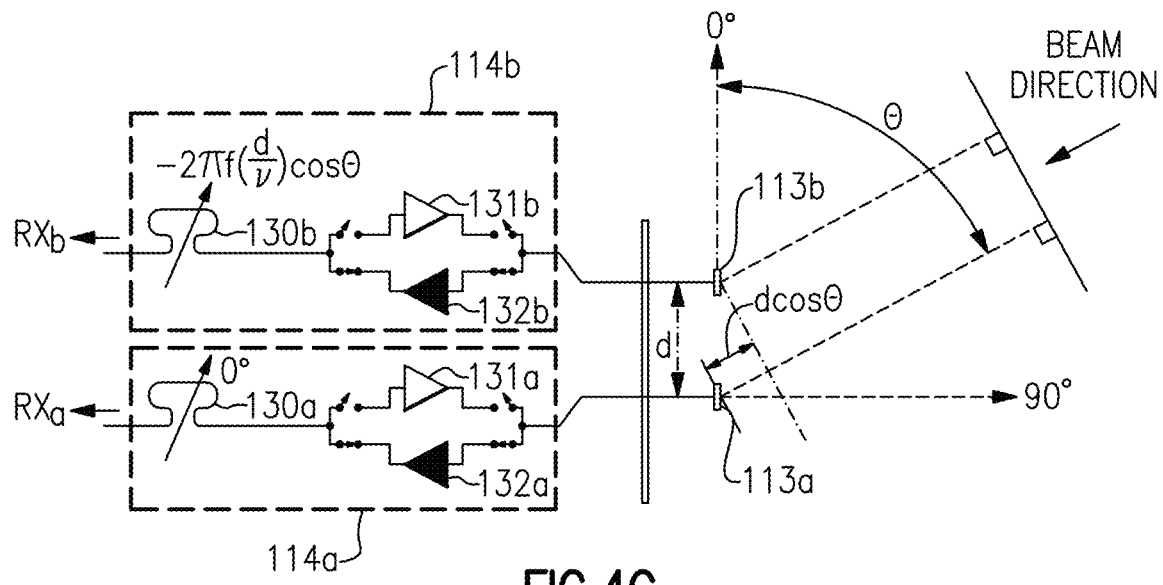
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130a and the second phase shifter 130b can be selected to about equal to $-2\pi f(d/v)\cos\theta$ radians to achieve a desired receive beam angle θ. In implementations in which the distance d corresponds to about ½λ, the phase difference can be selected to about equal to $-\pi\cos\theta$ radians to achieve a receive beam angle θ.

Although various equations for phase values to provide beamforming have been provided, other phase selection values are possible, such as phase values selected based on implementation of an antenna array, implementation of signal conditioning circuits, and/or a radio environment.

Apparatus and methods for distributing millimeter wave cellular service across a face of a building are provided. In certain embodiments, an antenna roof edge unit (REU) includes a linear antenna array (for example, a single row of patch antennas) extending out from (for instance, cantilever) from a roof a building and communicating downward (toward the ground). The antenna REU is in communication with at least one antenna window unit (WU) that includes a linear antenna array (for instance, a single row of patch antennas) communicating upward.

The antenna arrangement can be used in a wide variety of applications including, but not limited to, 47 GHz mmW cellular services. Table 1 below depicts various examples of 5G FR2 frequency bands that can be distributed over a face of a building in accordance with the teachings herein.

TABLE 1

| 5G Frequency Band | Band Duplex Type | UL/DL Low [MHz] | UL/DL High [MHz] |
| --- | --- | --- | --- |
| n257 | TDD | 26500 | 29500 |
| n258 | TDD | 24250 | 27500 |
| n259 | TDD | 39500 | 43500 |
| n260 | TDD | 37000 | 40000 |
| n261 | TDD | 27500 | 28350 |
| n262 | TDD | 47200 | 48200 |
| n263 (unlicensed) | TDD | 57000 | 71000 |

By implementing the antenna REU with a cantilever orientation, a need for spatial division can be reduced or eliminated. For example, each of the antenna elements in the antenna REU's linear antenna array can transmit the same signal with the same phase, and as such will direct transmit power downward from the roof-edge, covering the entire side of the building without any special steering.

Accordingly, in certain embodiments herein, each antenna of a linear antenna array of a REU transmits the same RF signal (of equal phase and of equal amplitude).

In certain implementations, multiple WUs can be served by the wide beam radiated from the antenna REU. Thus, in certain embodiments, spatial beam separation is not employed, greatly simplifying the system. Rather, multiple access can be achieved with frequency division, for example, each WU allocated its own resource blocks (RBs) within a given downlink transmission.

Moreover, the WU(s) can also be outfitted with the same or similar type of linear antenna array, but pointed upward toward the antenna REU. Thus WUs can be directed straight upward (for ease of installation), or each one angled as desired to point directly at the antenna REU for better link performance.

Furthermore, since the antenna REU provides one fixed beam (without any dynamic beam steering) to service a full side of a building, it can be advantageous to mount the antenna REU on one upper corner of the building in cases where the building is wider than it is tall. In this manner, coverage is provided without having to resort to installing multiple REUs above a wide building face.

In certain embodiments herein, an antenna REU communicates to a WU in a downlink direction.

Although referred to herein as an antenna REU for clarity of the description, an antenna REU need not be strictly placed on a roof of a building, but rather can be placed in any suitable location on a building for pointing downward toward receiving units. In one example, an antenna REU can be mounted on an upper portion of a building offset from the roof. The antenna REU is also referred to herein as an antenna upper unit.

Likewise, although referred to herein as an antenna WU for clarify of the description, an antenna WU need not be strictly placed on or in a window of a building, but rather can be placed in any suitable location on building for pointing upward toward the antenna upper unit. An antenna WU is also referred to herein as an antenna lower unit.

Figure 5A:
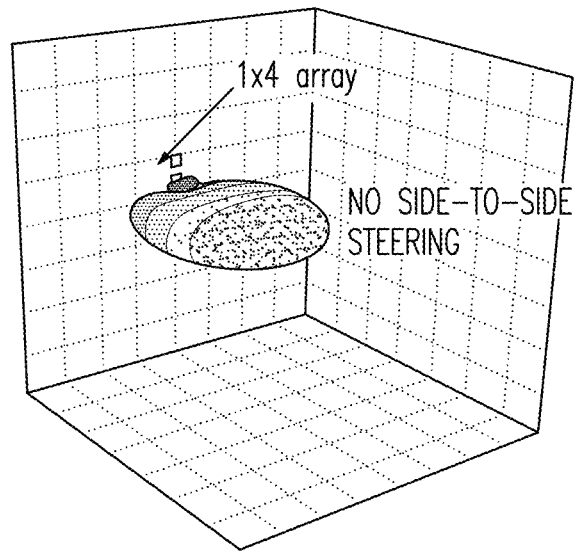
FIG. 5A is a perspective view of one example of an antenna radiation pattern for a row of patch antennas.
Figure 5B:
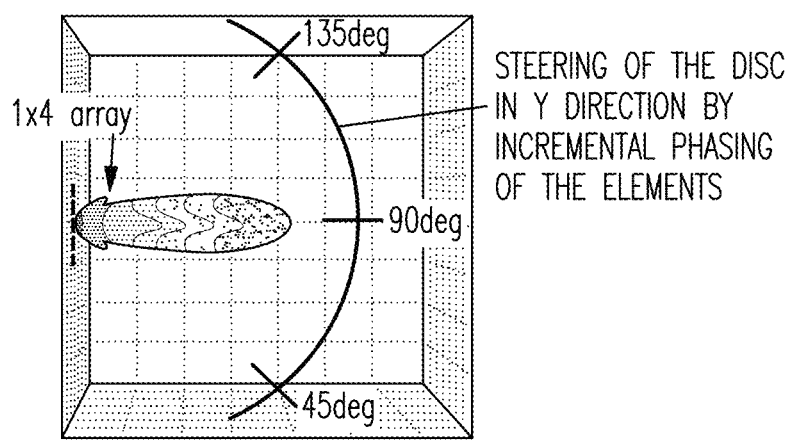
FIG. 5B is a side view of one example of an antenna radiation pattern for a row of patch antennas.

FIG. 5A is a perspective view of one example of an antenna radiation pattern for a row of patch antennas. FIG. 5B is a side view of one example of an antenna radiation pattern for a row of patch antennas.

In this example, the row of patch antennas corresponds to a one by four (1×4) array of patch antenna elements with lambda over two ($\lambda/2$) spacing. The individual patch pattern is about ninety degrees wide, and a ground plane is behind the array in this example. The displayed beam length is proportional to the electric field, which relates to the square root of the power used by the array.

As shown in FIGS. 5A and 5B, the antenna pattern fans out perpendicular to the linear array, forming a disc. No side-to-side beam steering is possible, since only one row is present. However, as shown in FIG. 5B, steering of the disc is possible in the y-direction by incremental phasing of the signals transmitted by the antenna elements.

For clarity of the drawings, the antenna REUs and antenna WUs herein are shown in enlarged size relative to the size of the building. Thus, the drawings are not shown to scale. For example, a building is typically on the scale of meters, while an antenna REU and antenna WU can be on the scale of centimeters.

FIG. 6A is a side view of one example of an antenna radiation pattern 591 for an antenna RFE 592 attached to a roof 593 of a building 594. FIG. 6B is a perspective view of the antenna radiation pattern 591 for the antenna RFE 593. FIG. 6C is a front view of the antenna radiation pattern 591 for the antenna RFE 592.

The antenna RFE 592 is positioned in a cantilevered orientation in which a single row of patch antenna elements cantilevers straight out and points down as shown toward the ground 595. For clarity of the drawings, FIG. 6B depicts the patch antenna elements as visible. However, in certain implementations the patch antenna elements would not be visible from above, for example, due to presence of a ground plane or other structures above the patch antenna elements.

The antenna RFE 592 uses a fixed 4-element arrangement that directs power straight down to prevent outward power waste. Although depicted as pointing straight down, in certain implementations the antenna RFE 592 angles slightly into or out from the face of the building if desired, either mechanically or by phasing the signals to point the disc-shaped antenna pattern in a particular direction. Although an example with four antenna elements is shown, the antenna arrays can include more or fewer antenna elements.

The antenna pattern 591 natural lateral spread forms a disc used to cover the entire side of the building. In this embodiment, phasing the elements to steer toward one area at a time is not proposed. Rather, all users across the face of the building (for instance, one or more antenna window units not shown in FIGS. 6A-6C) are serviced at the same time.

FIG. 6D is a schematic diagram of a building 601 implemented with millimeter wave cellular service distributed in accordance with another embodiment.

The building 601 includes a roof 602 from which an antenna RFE 611 extends cantilever. The antenna RFE 611 includes RF circuitry 613 and a linear antenna array including antenna elements 612a/612b/612c/612d arranged in a row. The linear antenna array 612a/612b/612c/612d communicates downward. In this example, the linear antenna array 612a/612b/612c/612d communicates using at least a first frequency $f_1$ and a second frequency $f_2$.

Although shown schematically as located on one end of the antenna RFE 611, the RF circuitry 613 can be positioned in different locations of the antenna RFE 611 or distributed around the antenna RFE 611 for signal path balancing or other design considerations. The antenna RFE 611 can further include other components not shown in FIG. 6D.

The building 601 also includes a first window 608a and a second window 608b. As shown in FIG. 6D, a first WU 621 extends from the first window 608a and includes RF circuitry 623 and a linear antenna array including antenna elements 622a/622b/622c/622d arranged in a row. The linear antenna array 622a/622b/622c/622d communicates upward. Additionally, a second WU 631 extends from the second window 608b and includes RF circuitry 633 and a linear antenna array including antenna elements 632a/632b/632c/632d arranged in a row. The linear antenna array 632a/632b/632c/632d communicates upward.

Although shown schematically as located on one end of the antenna WUs 621/631, the RF circuitry 623/633 can be positioned in different locations or distributed around a unit. The antenna WUs can further include other components not shown in FIG. 6D.

In the illustrated embodiment, the first WU 621 communicates upward using a first frequency $f_1$ using a first allocation of resource blocks ($RB_1$), while the second WU 622 communicates upward using a second frequency $f_2$ using a second allocation of resource blocks ($RB_2$). Thus, in this embodiment multiple WUs 621/631 are served by a wide beam radiated from the antenna REU 611, and spatial beam separation is not employed. Rather, multiple access is achieved with frequency division, for example, each WU allocated its own RBs within a given downlink transmission.

FIG. 6E is a schematic diagram of positioning of an antenna RFE 651 according to one embodiment. In this embodiment, the antenna RFE 651 extends from a center of a roof of a building 650. The building 650 is more tall than wide in FIG. 6E.

FIG. 6F is a schematic diagram of positioning of an antenna RFE 651 according to another embodiment. In this embodiment, the antenna RFE 651 extends from a corner of a roof of a building 660 and points downward at an angle along a face of the building 660 to provide coverage to one or more receiving antenna WUs (not shown in FIG. 6F). The building 660 is more wide than tall in FIG. 6F.

Figure 7A:
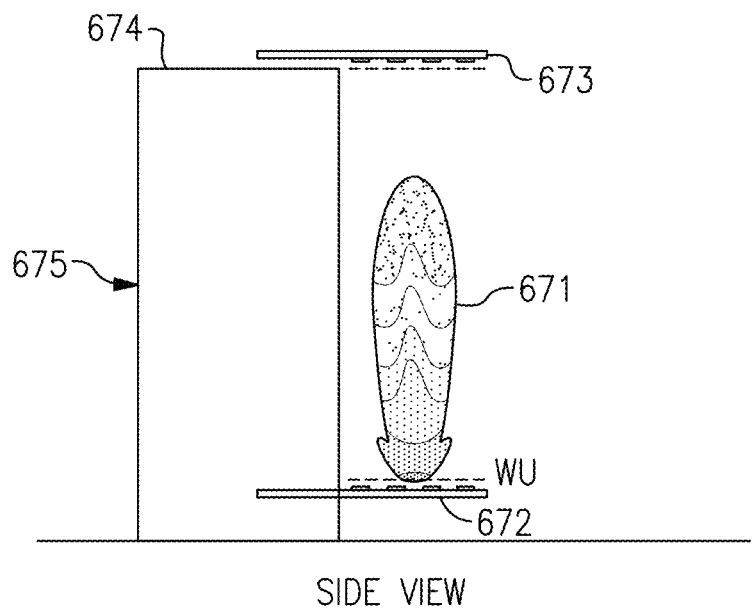
FIG. 7A is a side view of one example of an antenna radiation pattern for an antenna window unit (WU).
Figure 7B:
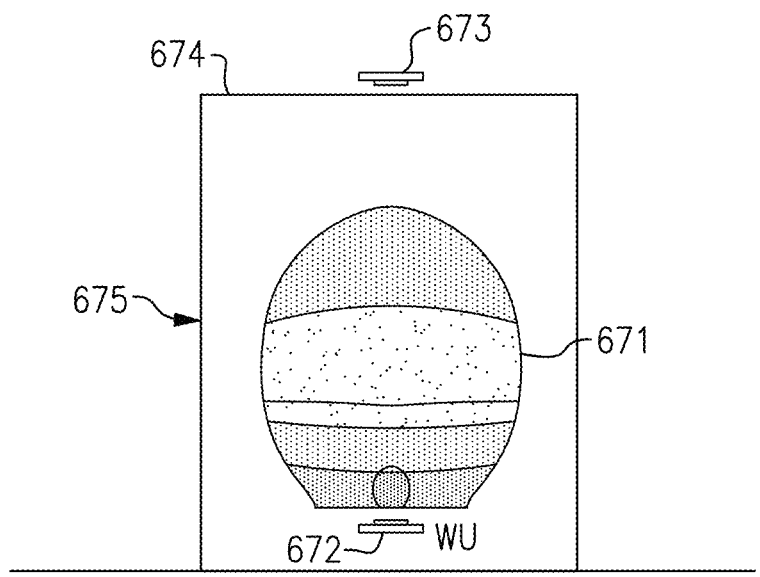
FIG. 7B is a front view of one example of an antenna radiation pattern for an antenna WU.

FIG. 7A is a side view of one example of an antenna radiation pattern 671 for an antenna WU 672 that communicates with an antenna REU 673 attached to a roof 674 of a building 675. FIG. 7B is a front view of the antenna radiation pattern 671 for the antenna WU 672.

As shown in FIGS. 7A and 7B, the antenna WU 672 of this embodiment includes a single row of patch antennas that cantilevers straight out, and points upward toward the antenna REU 673 as shown. In this example, fixed (non-steered and non-phased) 4-element transmissions are directed straight up. The antenna pattern's wide lateral spread forms a disc pattern similar to that of the REU 673 but pointing in an opposite direction (up rather than down).

In an example deployment, the antenna REU 673 and the antenna WU 672 are not on each other's axis (for example as shown in FIG. 6D), but the penalty or loss is typically small. For example, a worst case directional loss occurs with the antenna WU at a top corner of the building. In another implementation, each antenna WU is mounted to physically point at the antenna REU.

Figure 8A:
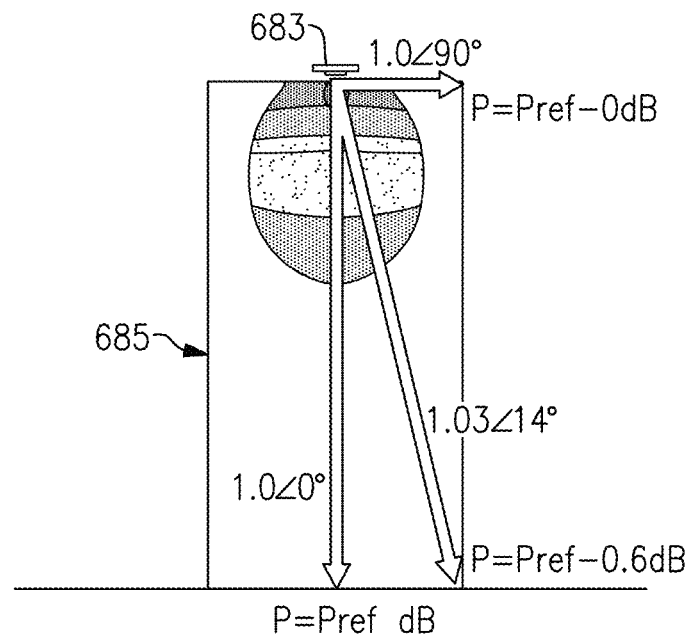
FIG. 8A is a front view of one example of a power distribution plot for an antenna RFE.

FIG. 8A is a front view of one example of a power distribution plot for an antenna RFE. The power distribution is for a face of a building with a 2:1 height to width ratio. When using a center mount, 0.6 dB variation among the three far corners is seen in this simulation. In this example, lengths are relative to building height, while angles are relative to array boresight.

With continuing reference to FIG. 8A, the array is 1 element wide and the beam is not steered. Variation in EIRP is due to patch pattern and building aspect ratio only. At the top of the building, the patch pattern loss is compensated for by the short lateral distance. For instance, at the top the simulation shows −12 dB due to patch pattern and +12 dB due to distance, while at the bottom the simulation shows −0.3 dB due to patch pattern and −0.3 dB due to distance.

Figure 8B:
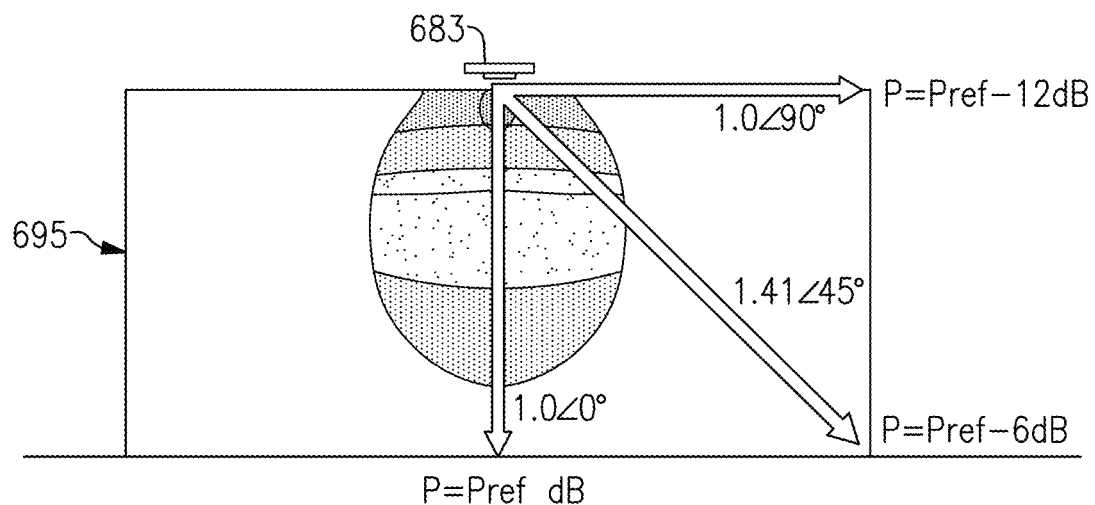
FIG. 8B is a front view of another example of a power distribution plot for an antenna RFE.

FIG. 8B is a front view of another example of a power distribution plot for an antenna RFE. The power distribution is for a face of a building with a 1:2 height to width ratio. When using a center mount, 12 dB variation among the three far corners is seen in this simulation. For instance, at the top the simulation shows −12 dB due to patch pattern and +0 dB due to distance, while at the bottom the simulation shows −3 dB due to patch pattern and −3 dB due to distance.

To compensate for the large relative loss at the top of the building, a number of techniques can be used including, but not limited to (1) multiple antenna REUs and/or (2) corner mounting of the antenna REU.

Figure 9A:
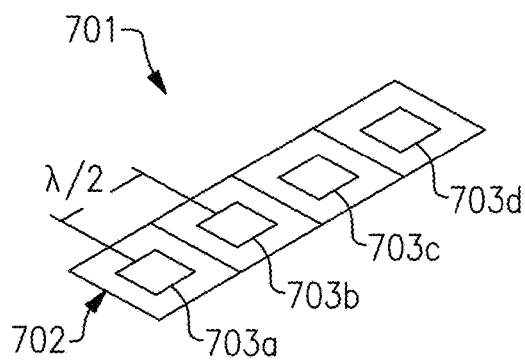
FIG. 9A is schematic diagram of one embodiment of a linear antenna array.

FIG. 9A is schematic diagram of one embodiment of a linear antenna array 702. The array 702 includes a 1×4 array of patch antennas 703a/703b/703c/703d, and is suitable for use for both an antenna REU and an antenna WU. The linear antenna array has a λ/2 pitch, for instance, 3.1 mm at 47.7 GHz. Patch antennas are driven on both polarizations, in this example.

The linear antenna array 702 includes one or more integrated power amplifiers, for instance, implemented as RF module(s) attached to the array. In one example, mmW silicon on insulator (SOI) power amplifier(s) are used. Such power amplifier(s) can be configured in a variety of ways. In a first example, the output of a single power amplifier is split multiple ways (for instance, n ways to service a 1 by n patch antenna array), with the same phase shift going to each antenna in the array. In a second example, the RF signal is split first, with the same phase on all n splitter outputs, going to n power amplifiers each dedicated to a corresponding antenna. The configuration of the second example can be advantageous at high frequencies, for instance, millimeter wave frequencies.

Figure 9B:
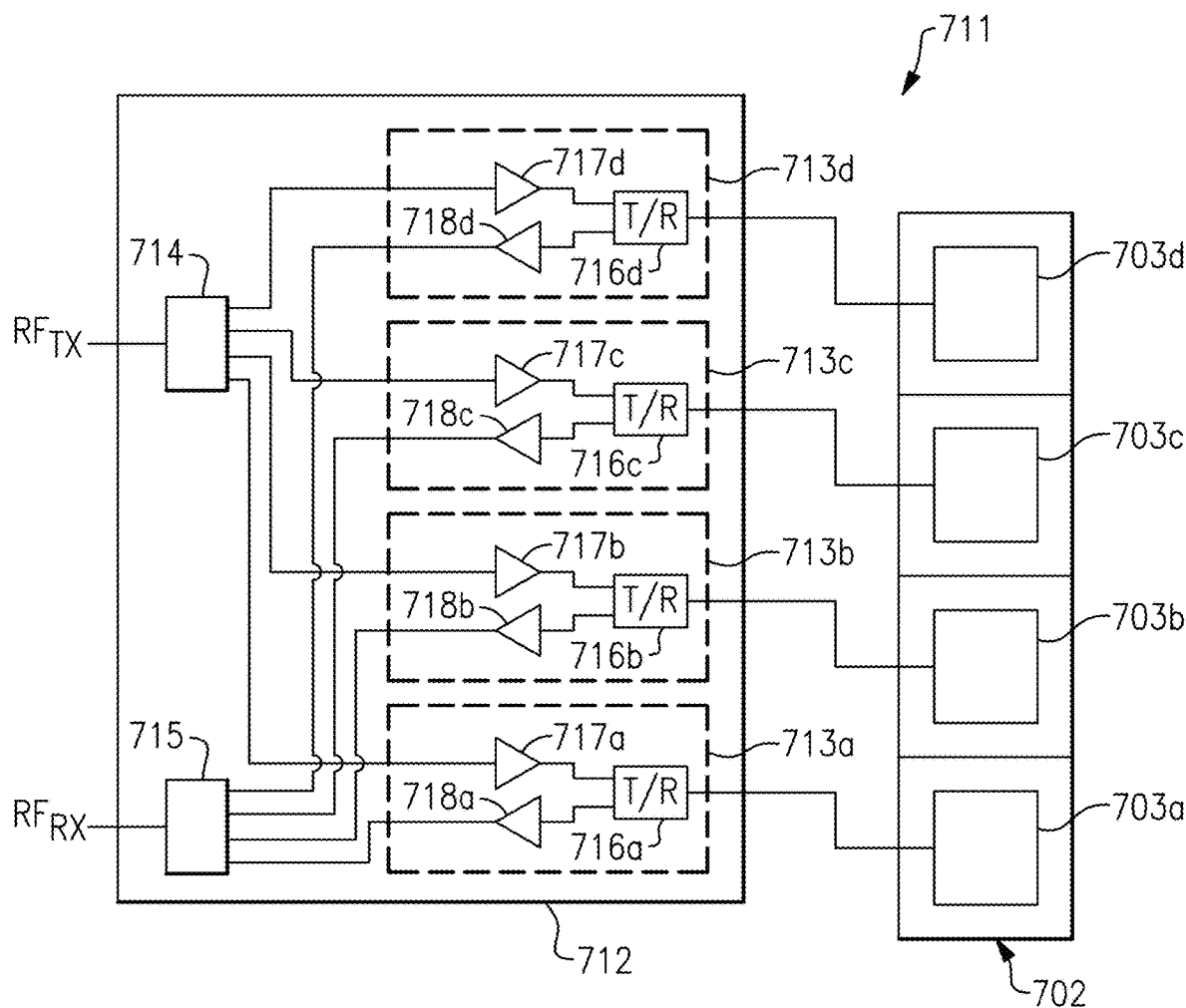
FIG. 9B is schematic diagram of one embodiment of another embodiment of an antenna unit with a linear antenna array.

FIG. 9B is schematic diagram of one embodiment of another embodiment of an antenna unit 711 with the linear antenna array 702. An example of RF circuitry 712 for connecting to the linear antenna array 702 is shown.

In this embodiment, the RF circuitry 712 includes a first RF signal conditioning circuit 713a coupled to the first antenna element 703a, a second RF signal conditioning circuit 713b coupled to the second antenna element 703b, a third RF signal conditioning circuit 713c coupled to the third antenna element 703c, a fourth RF signal conditioning circuit 713d coupled to the fourth antenna element 703d, an RF splitter 714, and an RF combiner 715.

As shown in FIG. 9B, the RF signal conditioning circuits 713a/713b/713c/713d include transmit/receive (T/R) switches 716a1716b/716c/716d, power amplifiers 717a1717b/717c/717d, low noise amplifiers 718a1718b/718c/718d, respectively. The RF splitter 714 splits an RF transmit signal $RF_{TX}$ to provide RF input signals of common amplitude and phase to the power amplifiers 717a-717d. The T/R switches 716a-716d control access of the power amplifiers 717a-717d and low noise amplifiers 718a-718d to the antenna elements 703a-703d, respectively. The RF output signals from the low noise amplifiers 718a-718d are combined by the RF combiner 715 to generate an RF receive signal $RF_{RX}$.

Figure 10:
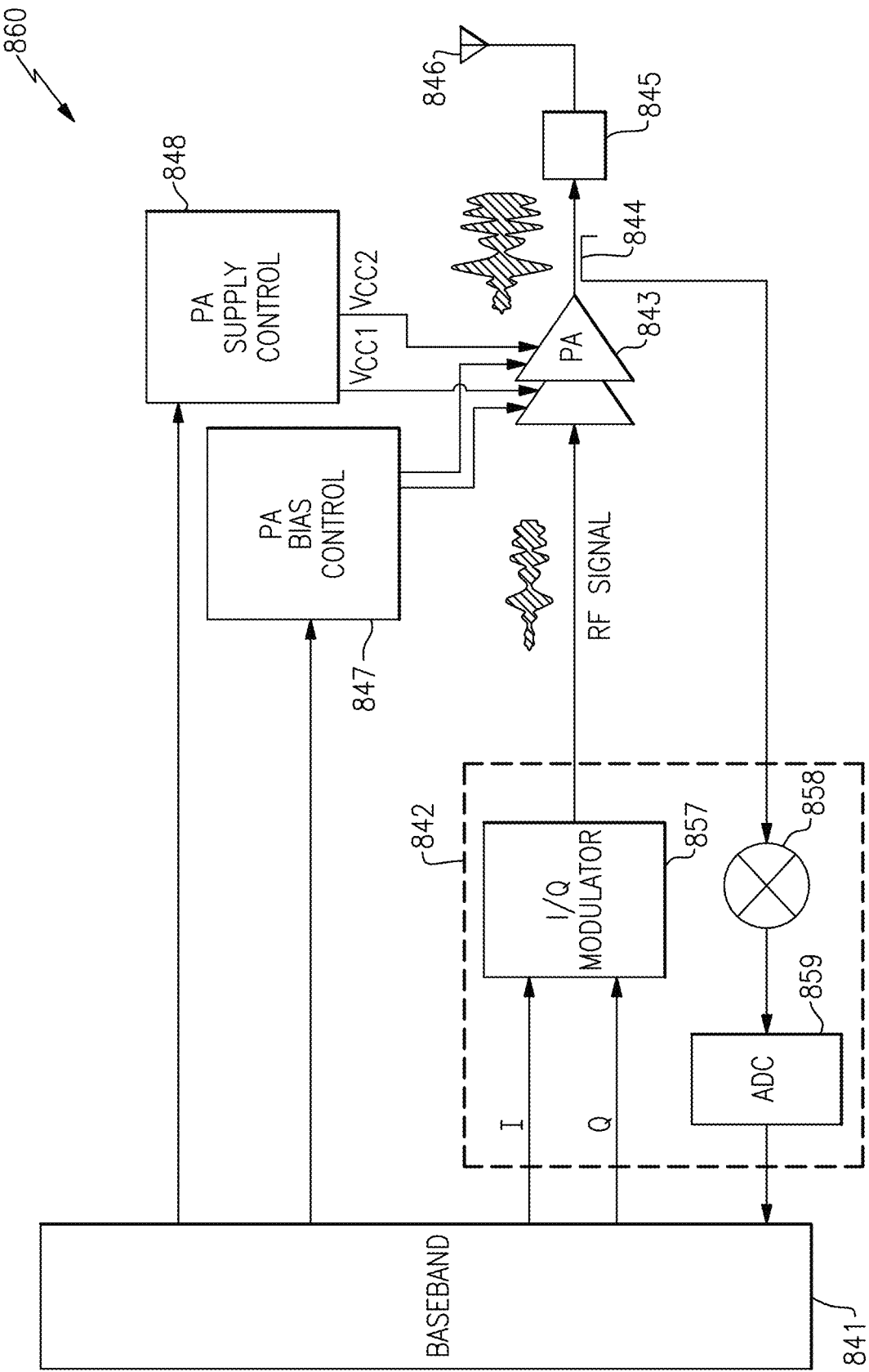
FIG. 10 is a schematic diagram of a power amplifier system according to one embodiment.

FIG. 10 is a schematic diagram of a power amplifier system 860 according to one embodiment. The illustrated power amplifier system 860 includes a baseband processor 841, a transmitter/observation receiver 842, a power amplifier (PA) 843, a directional coupler 844, front-end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front-end circuitry 845. Although one power amplifier and one antenna is depicted for clarity, multiple power amplifiers and/or multiple antennas can be included. In a first example, the output of a single power amplifier is split multiple ways (for instance, n ways to service a 1 by n patch antenna array), with the same phase shift going to each antenna in the array. In a second example, the RF signal is split first, with the same phase on all n splitter outputs, going to n power amplifiers each dedicated to a corresponding antenna.

The front-end circuitry 845 can be implemented in a wide variety of ways. In one example, the front-end circuitry 845 includes one or more switches, filters, duplexers, multiplexers, and/or other components. In another example, the front-end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 10, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An antenna assembly for distributing millimeter wave cellular service, the antenna assembly comprising:
   an antenna upper unit configured to extend from a top of a building, the antenna upper unit including a first linear antenna array configured to radiate a transmit beam having a disc-shaped pattern; and
   a first antenna lower unit configured to extend from the building beneath the antenna upper unit, the first antenna lower unit including a second linear antenna array configured to receive the transmit beam.

2. The antenna assembly of claim 1 wherein the first linear antenna array is configured to extend cantilever from a roof of the building.

3. The antenna assembly of claim 1 wherein the antenna upper unit further includes a plurality of power amplifiers configured to drive the first linear antenna array.

4. The antenna assembly of claim 1 wherein the first linear antenna array includes a single row of patch antennas.

5. The antenna assembly of claim 4 wherein each patch antenna in the single row of patch antennas receives a common radio frequency transmit signal of equal phase and amplitude.

6. The antenna assembly of claim 5 wherein a pitch of the single row of patch antennas is about equal to half a fundamental wavelength of the common radio frequency transmit signal.

7. The antenna assembly of claim 5 wherein the common radio frequency transmit signal is a millimeter wave signal.

8. The antenna assembly of claim 1 wherein the first linear antenna array and the second linear antenna array each include a single row of patch antennas.

9. The antenna assembly of claim 1 further comprising a second antenna lower unit, the first antenna lower unit and the second antenna lower unit configured to operate using different resource block allocations of the transmit beam.

10. A building with extended cellular coverage, the building comprising:
    a roof;
    an antenna upper unit extending from an edge of the roof, the antenna upper unit including a first linear antenna array configured to radiate a transmit beam having a disc-shaped pattern;
    a first window; and
    a first antenna lower unit extending from the first window, the first antenna lower unit including a second linear antenna array configured to receive the transmit beam.

11. The building of claim 10 wherein the first linear antenna array extends cantilever from the roof.

12. The building of claim 10 wherein the antenna upper unit further includes a plurality of power amplifiers configured to drive the first linear antenna array.

13. The building of claim 10 wherein the antenna upper unit is mounted to a corner of the roof.

14. The building of claim 10 wherein the first linear antenna array includes a single row of patch antennas.

15. The building of claim 14 wherein each patch antenna in the single row of patch antennas receives a common radio frequency transmit signal of equal amplitude and phase.

16. The building of claim 10 wherein the first linear antenna array points downward and the second linear antenna array points upward.

17. The building of claim 10 further comprising a second window and a second antenna lower unit extending from the second window, the first antenna lower unit and the second antenna lower unit configured to operate using different resource block allocations of the transmit beam.

18. A method for distributing millimeter wave cellular service, the method comprising:
    radiating a transmit beam having a disc-shaped pattern from a first linear antenna array of an antenna upper unit extending from a top of a building; and
    receiving the transmit beam at a second linear antenna array of a first antenna lower unit extending from a portion of the building beneath the top of the building.

19. The method of claim 18 further comprising driving the first linear antenna array with a plurality of power amplifiers each receiving an RF signal of equal amplitude and equal phase.

20. The method of claim 18 further comprising receiving the transmit beam at a third linear antenna array of a second antenna lower unit beneath the antenna upper unit.

* * * * *